United States Patent Office 2,776,904
Patented Jan. 8, 1957

2,776,904

ETHYL CELLULOSE EMULSIONS

Werner C. Brown, Deerhurst, Del., assignor to Hercules Powder Company, Wilmington, Del., a corporation of Delaware No Drawing. Application February 6, 1953,
Serial No. 335,594

20 Claims. (Cl. 106—170)

The invention relates to a method for producing an improved ethyl cellulose emulsion and to the emulsion thus produced. In a specific aspect this invention relates to a method for improving the properties of ethyl cellulose lacquer emulsions by incorporating novel surface-active agents in said emulsions and to the lacquer emulsions thus produced.

In recent years ethyl cellulose lacquer emulsions have been found to be useful as coating compositions for porous materials such as paper, leather, fabrics, and the like. However, in other fields where coating compositions are rather extensively used, the use of ethyl cellulose lacquer emulsions has been quite limited because of the poor water resistance and the low gloss characteristics of the emulsions. Also, the use of these emulsions as metal finishes has been somewhat restricted because of the poor gloss and unsatisfactory drying characteristics of the emulsions.

Heretofore ethyl cellulose lacquer emulsions have been prepared by mixing an ethyl cellulose lacquer with a water solution or suspension of an emulsifying agent using various proportions of lacquer to water solution or suspension. Lacquer-in-water emulsions have been prepared most easily by adding the lacquer to the water solution or suspension of the emulsifying agent or agents while the latter phase is being agitated. Subsequently the resulting "coarse" emulsion was further refined in a colloiding or homogenizing operation to improve the stability of the emulsion.

Certain combinations of emulsifying agents and protective colloids or emulsion stabilizers have been found rather effective in ethyl cellulose lacquer emulsions, but these combinations still have undesirable shortcomings. Probably foremost among these undesirable features is the inability of the emulsifier system to become an integral part of the emulsion film after application to the porous material. This disadvantageous feature often results in poor gloss and low water resistance of the emulsion film. Other undesirable features of these ethyl cellulose lacquer emulsions are difficulty of emulsification and poor emulsion stability, particularly of pigmented emulsions.

It is an object of this invention to provide a method for producing improved ethyl cellulose emulsions.

It is another object of this invention to provide a method for producing ethyl cellulose emulsions of improved stability.

It is another object of this invention to provide a method for producing ethyl cellulose lacquer emulsions wherein only simple mixing and stirring methods are required to produce a stable emulsion.

It is another object of this invention to provide novel ethyl cellulose emulsions.

It is a further object of this invention to provide novel ethyl cellulose lacquer emulsions of improved physical properties.

Further and additional objects of this invention will be apparent from the disclosure hereinbelow.

The above objects and other beneficial advantages of this invention are accomplished by incorporating in the ethyl cellulose emulsion a nonionic addition product of an alkylene oxide.

The following examples are illustrative of practical embodiments of this invention. In these examples an ethyl cellulose having an ethoxyl content of 47.5–49.0% and a viscosity of 100 cps. as determined in a 5% solution of an 80:20 toluene:ethanol mixture was employed. Also, all compositions are shown in parts by weight.

Example 1

In each of the following runs a lacquer having the following composition was employed.

| | |
|---|---|
| Ethyl cellulose | 15.0 |
| Triphenyl phosphate | 10.0 |
| Phenolic resin | 3.0 |
| Xylene | 40.0 |
| Hi-Flash naphtha | 24.0 |
| Butanol | 8.0 |
| Percent solids | 28.0 |

In run 1 a conventional ethyl cellulose aqueous emulsion having a composition that was preferred prior to this invention was employed. The lacquer phase was poured into the aqueous phase and the mixture was agitated with an air powered stirrer at a speed of 800 R. P. M. In run 2 a lacquer emulsion within the scope of this invention was similarly prepared by pouring the aqueous phase into the lacquer phase, and in run 3 another emulsion within the scope of this invention was prepared by adding the lacquer phase to the aqueous phase. The following data were observed:

| | Run 1 | Run 2 | Run 3 |
|---|---|---|---|
| Lacquer Phase: | | | |
| Ethyl cellulose lacquer | 98.7 | 97.5 | 98.0 |
| Oleic acid | 1.3 | | |
| Synthetic B79 | | 2.0 | 2.0 |
| Dioctyl sodium sulfosuccinate | | 0.5 | |
| Aqueous Phase: | | | |
| Distilled water | 99.3 | 99.5 | 99.5 |
| Dioctyl sodium sulfosuccinate | | 0.5 | 0.5 |
| Potassium hydroxide | 0.7 | | |
| Ratio Lacquer Phase to Aqueous Phase | 2.5:1 | 2.5:1 | 2.5:1 |
| Viscosity in Cps | | 1,400 | 1,400 |
| Type Emulsion | | Lacquer in water | Lacquer in water |
| Stability in Days | broke | 100+ | 100+ |

Synthetic B79 is a nonionic surface-active agent marketed by Hercules Powder Company. It is an adduct formed by the interaction of one mole of p-nonyl phenol and ten moles of ethylene oxide.

Example 2

In each of the following runs a lacquer having the following composition was employed.

| | |
|---|---|
| Ethyl cellulose | 16.0 |
| Triphenyl phosphate | 8.0 |
| Glycerol ester of hydrogenated rosin | 5.0 |
| Xylene | 53.0 |
| Hi-Flash naphtha | 10.0 |
| Butanol | 8.0 |
| Percent solids | 29.0 |

In run 4 an aqueous emulsion was prepared in a manner similar to that of run 1. Similarly, run 5 corresponds with run 2, and run 6 corresponds with run 3. The following data were observed:

|  | Run 4 | Run 5 | Run 6 |
| --- | --- | --- | --- |
| Lacquer Phase: |  |  |  |
| Ethyl cellulose lacquer | 98.7 | 97.5 | 98.0 |
| Oleic acid | 1.3 |  |  |
| Synthetic B79 |  | 2.0 | 2.0 |
| Dioctyl sodium sulfosuccinate |  | 0.5 |  |
| Aqueous Phase: |  |  |  |
| Distilled water | 99.3 | 99.5 | 99.5 |
| Dioctyl sodium sulfosuccinate |  | 0.5 | 0.5 |
| Potassium hydroxide | 0.7 |  |  |
| Ratio Lacquer Phase to Aqueous Phase | 2.5:1 | 2.5:1 | 2.5:1 |
| Viscosity in Cps |  | 6,200 | 2,200 |
| Type Emulsion |  | Lacquer in water. | Lacquer in water. |
| Stability in Days | broke | 100+ | 100+ |

*Example 3*

Desirable and improved ethyl cellulose aqueous emulsions can be produced by employing the following nonionic surface-active agents:

(1) An adduct formed by the interaction of dehydrogenated rosin and ethylene oxide.

(2) A polyglycol ether derivative of the monolauric ester of sorbitan (Tween 20 by Atlas Powder Company).

(3) A polyglycol ether derivative of the monostearic ester of sorbitan (Tween 60 by Atlas Powder Company).

(4) A polyalcohol ether of an alkylated phenol (Triton X-100 and Triton X-45 by Rohm and Haas Company).

The above data clearly demonstrate advantages of this invention. The new ethyl cellulose emulsions have an improved stability, and by practicing this invention it is possible to form stable emulsions when using only mild agitation during the formation of the emulsion.

The surface-active agents or wetting agents within the scope of this invention are of the water-soluble, nonionic type having hydrophilic groups which do not ionize. This property suggests an improvement over the cationic and anionic types of surface-active agents for use in lacquer emulsions since these latter types of surface-active agents are frequently unstable in the presence of inorganic pigments or other electrolytes which are present in the lacquer emulsion, either as necessary components or as impurities. Typical nonionic surface-active agents are condensates or addition products (adducts) of an alkylene oxide such as ethylene oxide, propylene oxide, butylene oxide, and the like. Ethylene oxide is the preferred alkylene oxide, and it will be employed in describing the details of the invention, but it will be understood that other similar alkylene oxides can be used in a similar capacity. To form the nonionic surface-active agent, the alkylene oxide, preferably ethylene oxide, is condensed with an organic compound containing a reactive hydrogen atom, for example, carboxylic acids, alcohols, phenols, amines, amides, and the like. Typical compounds are dehydrogenated rosin, alkylated phenols, mixtures of rosin and fatty acids, sorbitan monolaurate, and sorbitan monostearate. In forming the condensates or adducts the alkylene oxide and organic compound containing a reactive hydrogen atom are interacted, preferably in the presence of an alkaline catalyst, and condensed in varying molar proportions by replacement of reactive hydrogen by alkylene oxide. For example, a typical adduct can be produced by condensing fifteen moles of ethylene oxide with dehydrogenated rosin. The resulting product is a mixture of adducts containing varying proportions of ethylene oxide and dehydrogenated rosin as well as polymerized ethylene oxide, and this product mixture can be used as the nonionic surface-active agent in this invention. In the same manner ten moles of ethylene oxide can be condensed with one mole of dehydrogenated rosin to produce a mixture of adducts containing ethylene oxide and dehydrogenated rosin in varying molar proportions as well as condensed ethylene oxide. This product can similarly be used in practicing this invention. In the same manner varying molar proportions of alkylene oxide and organic compounds containing a reactive hydrogen atom can be used to form nonionic addition products which are effective surface-active agents within the scope of this invention.

The amount of adduct that is required in practicing this invention is variable and dependent upon such factors as the composition of the lacquer solution, the actual adduct or nonionic surface-active agent employed, and the like. In general, the amount will be such that the nonionic surface-active agent will represent from 1% to 4% of the total weight of the lacquer phase.

The nonionic surface-active agents discussed above can be used as the sole emulsifier for preparing ethyl cellulose lacquer emulsions. However, it has been found that improved results can be obtained when these nonionic surface-active agents are employed in conjunction with more active ionizable emulsifiers. All the ionizable emulsifier can be in the aqueous phase, and alternatively the ionizable emulsifier can be used in both phases. In Example 2 an emulsion of increased viscosity was obtained when the ionizable emulsifier was present in both phases. These ionizable emulsifiers can be of the cationic or anionic type. The preferred coemulsifier is dioctyl sodium sulfosuccinate, but other coemulsifiers can be used. For example, fatty alcohol sulfonates and their salts (fatty alcohol sulfates), an alkali metal salt of an alkyl-substituted naphthalene sulfonate, and the like, can be used as a coemulsifier. The amount of ionizable coemulsifier that is used is variable and in general within the range of 0.5% to 1.0% by weight of the water phase employed.

As a result of the use of these coemulsifiers with the nonionic surface-active agents discussed above, smooth and substantially stable emulsions can be made when using only simple high-speed stirring to intermix the lacquer and aqueous phases, and the films resulting from the application of these emulsions show markedly improved properties.

Generally speaking the ethyl cellulose emulsions of this invention comprise ethyl cellulose in solution in a substantially water-immiscible solvent or solvent mixture. The emulsions may also contain suitable pigments, for example, carbon black and the like, for producing the desired color in the emulsions. The emulsions are generally of the oil-in-water type, and the ethyl cellulose solution employed in producing the emulsion may contain such other ingredients as may be necessary for the production of, for example, a coating composition.

Emulsions in accordance with this invention include solutions of ethyl cellulose having a concentration of ethyl cellulose within the range of 10% to 40%. The ratio of ethyl cellulose solution to water in the ultimate emulsion is desirably within the range of 2:1 to 3:1 by weight. In the preparation of the emulsion any desired type of ethyl cellulose can be used, and the particular type of ethyl cellulose that is used will depend upon the ultimate use of the emulsion. In general ethyl celluloses of the type heretofore used in lacquer emulsions can be used to produce the emulsions within the scope of this invention. The ethyl cellulose can have a wide range of viscosity depending upon the ultimate use of the emulsion. For example, the ethyl cellulose can have a viscosity as measured in a 5% solution in an 80:20 toluene:ethanol mixture of 6 to 8 cps. or lower. On the other hand, the ethyl cellulose can have a relatively high viscosity, for example, 250 cps. or higher. Also, the ethoxyl content of the ethyl cellulose can vary from about 43 to about 50%. The ethyl cellulose can be prepared by any of the known procedures for its manufacture.

Any desired water-immiscible solvent or solvent mixture for the ethyl cellulose can be used. For example, the solvent may comprise an ester, such as ethyl acetate, butyl acetate, various aryl acetates, and the like, aromatic hydrocarbons, such as toluene, xylene, and the like, ketones, such as acetone, methyl ethyl ketone, cyclohexanone, and the like, alcohols, such as methanol, ethanol, isopropanol, butanol, and the like, ethers, such as Cellosolve, butyl Cellosolve, and the like, chlorinated hydrocarbons, such as methylene chloride, ethylene dichloride, and the like, and nitroparaffins, such as nitromethane, nitropropane, and the like. If desired, various cosolvents, for example, butyl alcohol, amyl alcohol, and the like, can be employed in a solvent mixture. Also, diluents can be used with the solvent or solvent mixture, for example, certain aliphatic hydrocarbons, and the like, or mixtures thereof. The particular solvent or solvent mixture including a diluent or diluents which can be used in the case of any given emulsion will be dictated by the ultimate use for which the emulsion is intended, the type of surface to which it is to be applied, the conditions under which it is to be dried, etc. The ethyl cellulose solution can contain various ingredients adapting it for the formation of, for example, a film or coating having desired characteristics. Thus, the ethyl cellulose solution can contain various ingredients generally used in the formation of lacquers or lacquer enamels such as plasticizers, for example, triphenyl phosphate, tricresyl phosphate, etc., or mixtures thereof. The usual gums and resins such as ester gum, dammar gum, phenolic resins, rosin maleate resins, and the like, can also be included. Where a plasticizer and/or a gum or resin is included in the ethyl cellulose solution, it can be included in any desired proportion depending upon the desired characteristics for the film or coating to be produced from the emulsion.

The property of lacquer particles, which represent the dispersed phase of a lacquer emulsion, to coalesce and form smooth continuous films when the water or continuous phase has evaporated, is largely dependent upon the viscosity of the lacquer particles or the viscosity of the lacquer solution. Thus, in lacquer emulsions of low solids content the maximum percent solids that can easily be laid down upon a surface to be coated is quite limited. The incorporation of the nonionic surface-active agents of this invention into a high solids lacquer improves the ability of the high viscosity particles to coalesce. Also, much shorter times are required for the emulsions to clear or rid themselves of water after application to a surface to be coated. Further, improved smoothness, clarity and gloss of the applied films have been noted.

The most effective anionic and cationic emulsifiers presently used in ethyl cellulose lacquer emulsions are incompatible with the lacquer solids. Since these emulsifiers are water-soluble, they are subject to leaching out when films in which they are dispersed are exposed to water. Consequently, these films have poor water resistance. To minimize the effect of such leaching out, these emulsifiers are generally used in small concentrations, but the low concentration requirement limits the effectiveness of the emulsifier. Also as a result of the use of limited concentrations of emulsifier, emulsification of the lacquer and aqueous phases is difficult, and the resulting emulsion has an undesirably low stability. The incorporation of nonionic surface-active agents improves the water resistance of emulsion films which contain even more than the minimum amount of an ionizable water-soluble emulsifying agent. A possible explanation of this apparent synergistic effect is that the nonionic agents which are less water-soluble and more oil-soluble than the ionic emulsifying agents aid in solubilizing the ionic emulsifying agent in the lacquer solids.

The stability of emulsions is considered to be a function of the efficiency of the emulsifying equipment employed as well as the effectiveness of the emulsifying agents in producing consistently small particles. The cost of colloiding or homogenizing equipment that is required for making stable emulsions as well as the cost of the colloiding operations generally detracts from the advantages of emulsions. The lacquer emulsions within the scope of this invention and containing nonionic surface-active agents are more easily emulsified than emulsions of the same composition but containing no nonionic surface-active agent. In particular, it was found that stable emulsions containing the nonionic surface-active agents described above could be produced when employing an air powered stirrer or other simple agitating means to intermix the lacquer and aqueous phases. No colloiding or homogenizing equipment was required for the production of stable emulsions. However, heretofore such equipment was necessary for the production of stable emulsions when either cationic or anionic emulsifiers were employed without any nonionic surface-active agents. Furthermore, the films resulting from the emulsions within the scope of this invention in general have properties equivalent to those that are produced by passage of the same emulsion through a colloiding or homogenizing mill. Evidence that these nonionic emulsifiers improve ease of emulsification is shown by the fact that lower solids emulsions than those evaluated in the above examples are much less stable and produce films of inferior properties when compared in a similar manner and using emulsifying systems containing anionic or cationic emulsifying agents.

The incorporation of the nonionic surface-active agent in the emulsion imparts better resistance to breaking by freezing than ionic emulsifiers. This fact was observed when a group of lacquer emulsions was exposed to freezing temperatures. Without exception, those emulsions that contained ionic emulsifiers broke as a result of the freezing. On the other hand, those emulsions containing nonionic surface-active agents did not break.

Numerous modifications within the scope of this invention will be apparent from the above detailed disclosure.

What I claim and desire to protect by Letters Patent is:

1. The method of producing an improved ethyl cellulose lacquer emulsion wherein the ethyl cellulose is dissolved in a water-immiscible liquid which comprises agitating water and said solution in the presence of a nonionic surface-active agent which is an addition product of an alkylene oxide as the emulsifier to produce an emulsion containing the ethyl cellulose in the dispersed phase.

2. The method of producing an improved ethyl cellulose lacquer emulsion wherein the ethyl cellulose is dissolved in a water-immiscible liquid which comprises agitating and intimately admixing water and said solution in the presence of a nonionic surface-active agent which is an addition product of an alkylene oxide and a compound containing a reactive hydrogen atom as the emulsifier to produce an emulsion containing the ethyl cellulose in the dispersed phase.

3. The method of producing an improved ethyl cellulose lacquer emulsion wherein the ethyl cellulose is dissolved in a water-immiscible liquid which comprises agitating and intimately admixing water and said solution in the presence of from 1% to 4% by weight, based on said solution, of a nonionic surface-active agent which is an addition product of ethylene oxide and a compound containing a reactive hydrogen atom as the emulsifier to produce an emulsion containing the ethyl cellulose in the dispersed phase.

4. The method of producing an improved ethyl cellulose lacquer emulsion wherein the ethyl cellulose is dissolved in a water-immiscible liquid which comprises agitating water and said solution in the presence of from 1% to 4% by weight, based on said solution, of a nonionic surface-active agent which is an addition product of ethylene oxide and a compound containing a reactive hydrogen atom, and from 0.5% to 1% by weight of the water of an ionizable surface-active agent as the co-emulsifier to produce an emulsion containing the ethyl cellulose in the dispersed phase.

5. The method according to claim 4 wherein the compound containing a reactive hydrogen atom is dehydrogenated rosin.

6. The method according to claim 4 wherein the compound containing a reactive hydrogen atom is an alkylated phenol.

7. The method according to claim 4 wherein the nonionic addition product is a polyglycol ether derivative of the monolauric ester of sorbitan.

8. The method according to claim 4 wherein the nonionic addition product is a polyglycol ether derivative of the monostearic ester of sorbitan.

9. The method according to claim 4 wherein the nonionic addition product is a polyalcohol ether of an alkylated phenol.

10. The method according to claim 4 wherein the ionizable surface-active agent is dioctyl sodium sulfosuccinate.

11. An aqueous ethyl cellulose lacquer emulsion wherein the ethyl cellulose is dissolved in a water-immiscible liquid comprising, in addition as the emulsifier, a nonionic surface-active agent which is an addition product of an alkylene oxide, said ethyl cellulose being in the dispersed phase.

12. An aqueous ethyl cellulose lacquer emulsion wherein the ethyl cellulose is dissolved in a water-immiscible liquid comprising, in addition as the emulsifier, a nonionic surface-active agent which is an addition product of an alkylene oxide and a compound having a reactive hydrogen atom, said ethyl cellulose being in the dispersed phase.

13. An aqueous ethyl cellulose lacquer emulsion wherein the ethyl cellulose is dissolved in a water-immiscible liquid comprising, in addition as the coemulsifier, from 1% to 4% by weight, based on said solution, of a nonionic surface-active agent which is an addition product of an alkylene oxide and a compound having a reactive hydrogen atom, and from 0.5% to 1% by weight of the water of an ionizable surface-active agent, said ethyl cellulose being in the dispersed phase.

14. An emulsion according to claim 13 wherein a nonionic addition product of ethylene oxide and dehydrogenated rosin is employed.

15. An emulsion according to claim 13 wherein a nonionic addition product of ethylene oxide and an alkylated phenol is employed.

16. An emulsion according to claim 13 wherein the nonionic addition product is a polyglycol ether derivative of the monolauric ester of sorbitan.

17. An emulsion according to claim 13 wherein the nonionic addition product is a polyglycol ether derivative of the monostearic ester of sorbitan.

18. An emulsion according to claim 13 wherein the nonionic addition product is a polyalcohol ether of an alkylated phenol.

19. An emulsion according to claim 13 wherein the ionizable surface-active agent is dioctyl sodium sulfosuccinate.

20. An emulsion according to claim 13 wherein the ethyl cellulose has an ethoxyl content of 43%–50%.

References Cited in the file of this patent

UNITED STATES PATENTS

| | | |
|---|---|---|
| 2,288,261 | Abrams | June 30, 1942 |
| 2,382,533 | Auer | Aug. 14, 1945 |
| 2,410,382 | Kaplan | Oct. 29, 1946 |

OTHER REFERENCES

"Spans and Tweens," Atlas Powder Co., Wilmington, Del. (1945), pp. 1 to 4, 11 and 12, reprint June 1945.